(12) United States Patent
Hasegawa

(10) Patent No.: US 7,039,731 B2
(45) Date of Patent: May 2, 2006

(54) USB INTERFACE HAVING SELECTOR FOR TRANSMITTING USB SIGNAL TO CONVERSION CIRCUIT AND ANOTHER USB INTERFACE

(75) Inventor: Makoto Hasegawa, Kashiwazaki (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/601,221

(22) Filed: Jun. 20, 2003

(65) Prior Publication Data

US 2004/0088468 A1 May 6, 2004

Related U.S. Application Data

(62) Division of application No. 09/533,774, filed on Mar. 24, 2000, now abandoned.

(30) Foreign Application Priority Data

Mar. 25, 1999 (JP) ................................ 11-082524

(51) Int. Cl.
  *G06F 3/00* (2006.01)
  *G06F 13/38* (2006.01)
  *G06F 5/00* (2006.01)
(52) U.S. Cl. .......................... 710/38; 710/62; 710/65; 710/2; 710/8; 710/14; 710/19
(58) Field of Classification Search ................. 710/19, 710/61–74, 2, 5, 29, 8–17, 36–38
See application file for complete search history.

(56) References Cited

U.S. PATENT DOCUMENTS

| 5,645,434 A | * | 7/1997 | Leung .......................... 439/74 |
| 5,987,106 A | | 11/1999 | Kitamura |
| 6,073,188 A | * | 6/2000 | Fleming ........................ 710/38 |
| 6,137,686 A | * | 10/2000 | Saye ........................... 361/732 |
| 6,141,221 A | | 10/2000 | Tong et al. |
| 6,584,519 B1 | * | 6/2003 | Russell ......................... 710/62 |

FOREIGN PATENT DOCUMENTS

| JP | 7-36585 | 2/1995 |
| JP | 10-116139 | 5/1998 |
| JP | 10-15460 | 6/1998 |
| JP | 10-240382 | 9/1998 |

* cited by examiner

*Primary Examiner*—Kim Huynh
*Assistant Examiner*—Joshua D. Schneider
(74) *Attorney, Agent, or Firm*—Foley & Lardner LLP

(57) ABSTRACT

A USB cable connects to a USB connector in an electrical/electronic product and a USB connector in a separate type USB unit so that a USB controller and a conversion circuit are connected. The conversion circuit converts a USB signal into an external interface signal which is transmitted to and received from a peripheral device. The external interface signal is transmitted to and received from the peripheral device through an external interface connector. The minimum number of interface connector is selected from various external interface connectors through which the external interface signal is transmitted to and received from the peripheral device. By connecting expansion connectors 5 and 6 in a USB unit and those in another USB unit, the USB signal is transmitted and received between the USB unit and another USB unit.

9 Claims, 9 Drawing Sheets

PRIOR ART

USB INTERFACE HAVING SELECTOR FOR TRANSMITTING USB SIGNAL TO CONVERSION CIRCUIT AND ANOTHER USB INTERFACE

This application is a divisional of application Ser. No. 09/533,774, filed Mar. 24, 2000, now abandoned.

BACKGROUND OF THE INVENTION

1. Field of the Invention

The present invention relates to a Universal Serial Bus (USB) unit for connecting an electrical/electronic product of a personal computer or the like and a peripheral device. This application is based on Japanese Patent Application No. Hei 11-82524, the contents of which are incorporated herein by reference.

2. Description of Related Art Including Information Disclosed Under 37 CFR 1.97 and 37 CFR 1.98

A Universal Serial Bus (USB) is an interface standard for connecting a personal computer and a peripheral device, and is adopted in almost all new machines with Window 98® installed. According to the USB, a keyboard, a mouse, a modem, and the like can be easily connected to a computer with one interface and parts or the like can have low cost. The peripheral devices which can be connected with the personal computer include a keyboard, a mouse, a scanner, a modem, or the like, having a relatively rapid data transfer rate, and they are connected through a tree structure to a personal computer using the USB unit. Furthermore, if a conversion circuit is arranged in the USB unit, peripheral units such as a high-speed printer can be connected to the personal computer.

In conventional kinds of these USB units, USB port bars, and the like, various conversion circuits and external interfaces are integrated in a USB unit. An example is shown in FIG. 9.

Since a USB unit 100 is connected to an electrical/electronic device 102 with a USB cable 103, a USB controller 111 in the electrical/electronic device 102 is connected to a USB_HUB 105 in the USB unit 100. After conversion circuits 106-1, 106-2, 106-3, and 106-4 are connected to the USB_HUB 105 and each USB signal 114 is converted to each interface signal for a peripheral device in each conversion circuit, each interface signal is transmitted to the peripheral devices 107-1, 107-2, 107-3, and 107-4 through the external interface correctors 109-1, 109-2, 109-3, and 109-4 respectively. Basically, in one USB unit, conversion circuits and external interface connectors for various peripheral devices are arranged.

If an external USB connector 110 is arranged in the USB unit 100, an exterior type USB unit 108 can be connected to the USB unit 100 using the external USB connector 110 and a USB cable 103.

Moreover, to reduce inconveniences caused by a cable at the time of connecting peripheral equipments with each other by constituting a connection means provided on one peripheral equipment, a USB hub is connected with a USB connector through the cable and is provided with a connector for a mouse and a keyboard and the connector for a power supply in a projected shape and the connector for data signal transmission on an upper surface similarly to a floppy disk drive device. Thus, the respective connectors further provided on the upper surface of the USB hub and the respective connectors provided on the bottom surface of the peripheral equipment, it is mounted on it and the respective connectors are fitted with each other (disclosed in Japanese Unexamined Patent Application, First Publication, No. Hei 10-240382.)

And further, a device is equipped with a USB hub, connected to a computer device equipped with a root hub, which has an up-string port UP1 that is so controlled as to display information, equipped with a power supply part, and connected to the root hub of the computer device, and down-string ports DP1 to DP3 which receive power source switching information from the computer through the up-string port and selectivity outputs the electric power supplied from the power supply part, to enable a user to easily install the peripheral equipment (disclosed in Japanese Unexamined Patent Application, First Publication, No. Hei 10-116139.)

Furthermore, to eliminate defects due to providing a connection portion of a peripheral device on the backside of a CPU, a monitor base is constituted as a serial bus hub supporting a monitor rotationally and having plural ports for interface with a peripheral device such as a keyboard and a mouse. When the peripheral device is connected to the port, it is connected to a serial bus via serial bus output connecting means, and thereby the peripheral device can communicate with a CPU. Since there is no need for connecting the peripheral device to the backside of the CPU, cable connection and maintenance are facilitated, and the cable can be prevented from being caught (disclosed in Japanese Unexamined Patent Application, First Publication, No. Hei 10-154560.)

However, conventional techniques like the above have some problems as the following:

As a first problem, since many external interface connectors and external USB connectors are arranged in one USB unit, the number of inner connectors or other parts increases, and therefore, the USB unit increases in size and weight.

As a second problem, when the USB unit is portably carried, the USB unit has nothing but the necessary function mechanisms for a user; however, since the conventional USB unit is integrated with the conversion circuits, external interface connectors, and the like, the user must carry the USB unit with unnecessary function mechanisms. This means that the user must carry the USB unit having excessive weight.

As third problem, since the USB unit has many external interface connectors and external USB connectors for connecting a peripheral device to the USB unit, the physical amount of the inner circuits and the number of connectors increase, therefore, MTBF (Mean Time Between Failures) deteriorates.

As forth problem, since a expansion USB unit must be connected to the USB unit with a cable to extend the USB unit or the like, a space for the cable is required.

BRIEF SUMMARY OF THE INVENTION

In light of the above problems, the first object of the present invention is to provide a small and lightweight USB unit by decreasing amount of hardware.

The second object of the present invention is to provide a USB unit having excellent MTBF by reducing the number of components.

The third object of the present invention is to provide a USB unit having good portability by preparing USB unit is corresponding to external interface connectors having minimum numbers.

The forth object of the present invention is to provide a USB unit without a cable for extension.

To achieve the above objects, as a first aspect, the present invention provides a USB unit in which an electrical/electronic product is connected to a peripheral device by transmitting and receiving a USB signal, comprising the minimum number of external interface connectors selected from various external interface connectors for the peripheral device and an expansion connector for connecting the USB unit to another USB unit.

As the second aspect, the present invention provides a USB unit in which an electrical/electronic product is connected to a general peripheral device by transmitting and receiving a USB signal, comprising a USB connector to transmit and receive the USB signal between the USB unit and the electrical/electronic product, a conversion circuit to convert the USB signal into an external interface signal that is transmitted to and received from the general peripheral device, the minimum number of external interface connectors selected from various external interface connectors for transmitting and receiving between the general peripheral device and the USB unit, and at least one expansion connector to conduct the USB signal to another USB unit.

As the third aspect, the present invention provides a USB unit in which an electrical/electronic product is connected to a USB peripheral device by transmitting and receiving a USB signal, comprising a USB connector to transmit and receive the USB signal between the USB unit and the electrical/electronic product, an external interface connector to transmit and receive the USB signal between the USB peripheral device and the USB unit, at least one expansion connector to conduct the USB signal to another USB unit, and a USB_HUB to extend the USB and conduct the USB signal to the external interface connector and the expansion connector.

As the fourth aspect, the present invention provides a USB unit in which an electrical/electronic product is connected to a general peripheral device and a USB peripheral device by transmitting and receiving a USB signal, comprising at least one first USB unit and at least one second USB unit, a USB connector to transmit and receive the USB signal between the electrical/electronic product and one of the USB units, and these USB units are respectively connected to adjacent USB units by connection; wherein the first USB unit comprises a conversion circuit to convert the USB signal into an external interface signal that is transmitted to and received from the general peripheral device, the minimum number of external interface connectors selected from various external interface connectors for transmitting and receiving between the general peripheral device and the first USB unit, and at least one expansion connector for providing the connection; and the second USB unit comprises an external interface connector for transmitting and receiving the USB signal between tie USB peripheral device and the second USB unit, at least one expansion connector for providing the connection, and a USB_HUB to extend the USB and conduct the USB signal to the external interface connector and the expansion connector.

Furthermore, the USB unit may comprise a selector which is provided so as to connect the USB connector to the conversion circuit when the USB unit is individually connected to the general peripheral device and connect the USB connector to the expansion connector when the USB unit is connected to another USB unit with the expansion connector.

Since the USB unit of the present invention is a separate type USB unit which is connected to the electrical/electronic product via a USB connector and the number of parts per one separate type USB unit is reduced by integrating the minimum external interface connectors into the separate type USB unit, the USB unit can be improved in reduction of the outside dimension and weight thereof.

And further, since the number of parts per one USB unit is reduced, MTBF of the USB unit can be improved.

And further, since the separate type USB unit comprises the minimum external interface connectors which are selected from various interface connectors for a serial interface, a parallel interface, a PS/2 interface, a LAN interface, and a USB interface, a separate type USB unit is provided according to the type of external interface connector, the separate type USB unit can be selected and bought as required, and therefore, the separate type USB unit can portably be carried on a user.

And further, since the number of the USB ports increases by preparing the separate type USB unit integrating the USB_HUB and a means for connecting the separate type USB units to each other by connecting their expansion connectors is provided, a space for cables is not required when the USB is extended.

And further, since the selector for switching the USB signal path by a signal which transmits the connection status between the separate type USB units is integrated in the separate type USB unit, while connecting the separate type USB units to each other, if any one of the USB connectors in the separate type USB unit is connected with the USB connector in the electrical/electronic product with the USB cable or the like, the electrical/electronic product can be connected to the peripheral device and the USB peripheral device.

Furthermore, since the separate type USB unit integrates the expansion connector, the expansion connector in the separate type USB unit can be connected with an expansion connector in another separate type USB unit. For example, when a separate type USB unit is connected with the electrical/electronic product by connecting respective USB connectors with a USB cable or the like, the external interface connector in only one separate type USB unit is connected to the electrical/electronic product; however, when the separate type USB unit is further connected to another separate type USB unit by connecting respective expansion connectors, the electrical/electronic product can be connected to the external interface connector in another separate type USB unit.

Since plural separate type USB units are connected by connecting the expansion connectors to each other, the number of those external interface connectors corresponding to the separate type USB units which are connected each other corresponds to the number of the peripheral device or the USB peripheral devices which are connectable to each USB connector integrated in the electrical/electronic product.

Moreover, when separate type USB units are connected by connecting the expansion connectors to each other, a USB connector in any one of separate type USB units is connected with a USB connector in the electrical/electronic, product with the USB cable or the like, then, through the external interface connector in another separate type USB unit, the electrical/electronic product integrating the USB connector can be connected to the peripheral device and the USB peripheral device connectable to the external interface connector.

DETAILED DESCRIPTION OF THE INVENTION

The embodiments of the present invention are explained referring to the figures.

Figure 1:
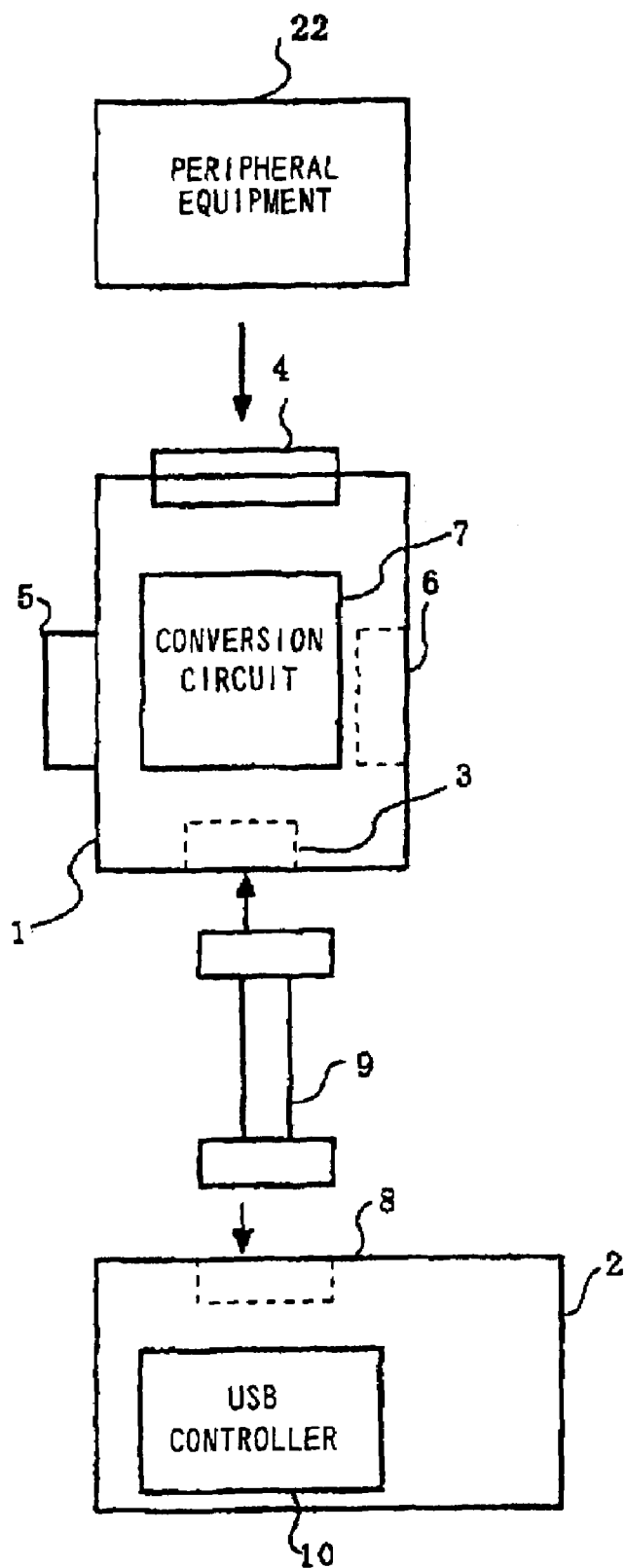
FIG. 1 is a block diagram illustrating the first embodiment of the present invention.

FIG. 1 shows a block diagram for the first embodiment of the present invention. A separate type USB unit 1 comprises a USB connector 3 for connecting the separate type USB unit 1 and an electrical/electronic device 2 integrating a USB connector 8 with a USB cable 9 or the like, an external interface connector 4 having the minimum number of connectors for an external interface selected from various external interfaces such as serial interface, parallel, interface, PS/2, and LAN for connecting the separate type USB unit 1 to a peripheral device 22, a conversion circuit 7 for converting a USB signal into an external interface signal, and expansion connectors 5 and 6 for connecting the separate type USB unit 1 or a separate type USE unit 12 shown in FIG. 2 and another separate type USB unit.

A type of the external interface connector 4 depends on the design of the conversion circuit 7. For example, if the conversion circuit 7 is a circuit for converting the USB signal and the serial signal, a serial interface connector is used as the external interface connector 4.

Figure 2:
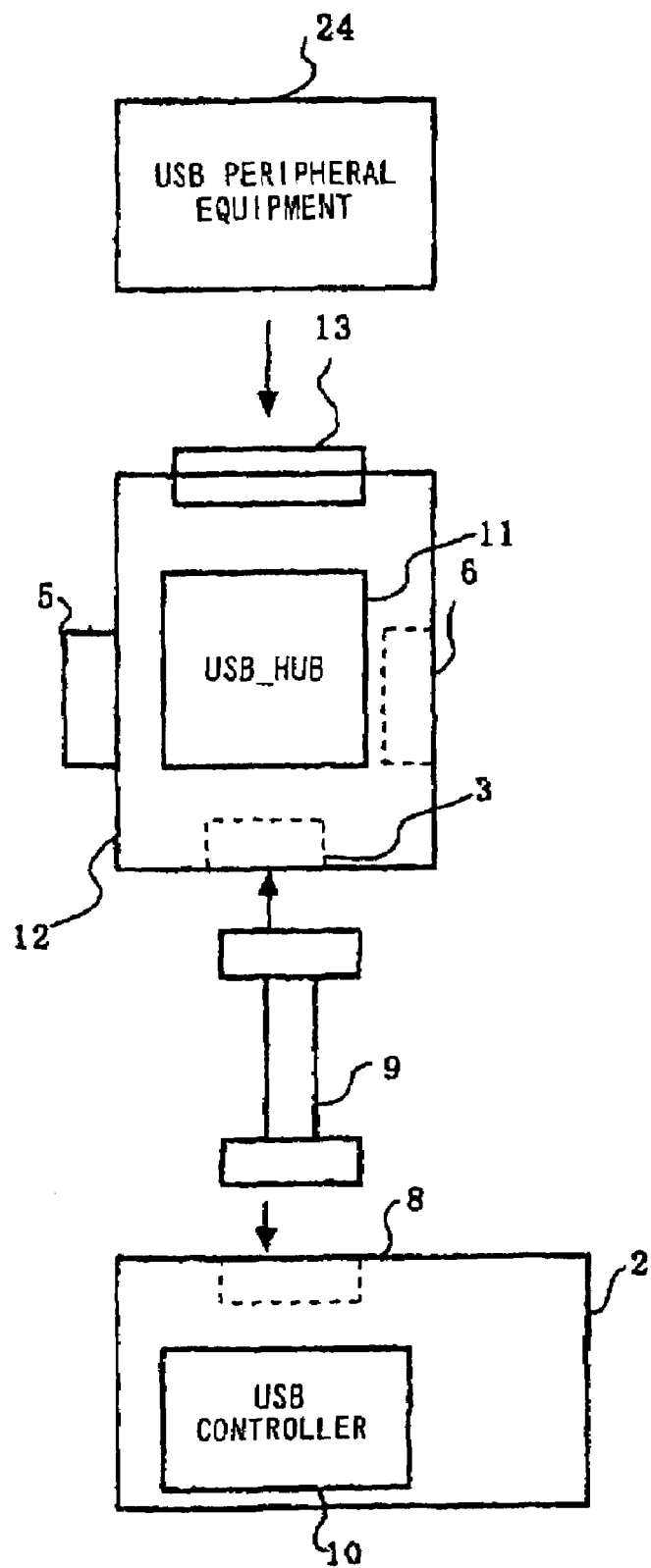
FIG. 2 is a block diagram illustrating the second embodiment of the present invention.

FIG. 2 shows a block diagram for the second embodiment of the present invention. This separate type USB 12 is connected to the separate type USB unit 1 shown in FIG. 1 with the expansion connector 5 or 6. The separate type USB unit 12 comprises a USB connector 3 for connecting the separate type USB unit 12 and an electrical/electronic device 2 integrating a USB connector 8 with the USB cable 9, or the like, a USB_HUB 11 for extending a USB, and an external interface connector 13 for connecting the separate type USB unit 12 and a USB peripheral device 24.

Similar to the separate type USB unit 1, the separate type USB unit 12 comprises the expansion connectors 5 and 6 for connecting the separate type USB unit 12 and another separate type USB unit 1 or separate type USB unit 12.

In the following, the actions of the separate type USB units shown in FIGS. 1 and 2 will be explained.

First, actions of the separate type USB unit 1 are explained with reference to FIGS. 1 and 4.

As shown in FIG. 1, the electrical/electronic product 2 is connected with the separate type USB unit 1 by connecting the USB connector 8 integrated in the electrical/electronic product 2 and the USB connector 3 integrated in the separate type USB unit 1 with the USB cable 9 or the like. An external interface signal of a serial interface, a parallel interface, a PS/2, a LAN, or the like is transmitted to and received from the external interface connector 4 so as to connect the peripheral device 22 and the separate type USB unit 1.

Figure 4:
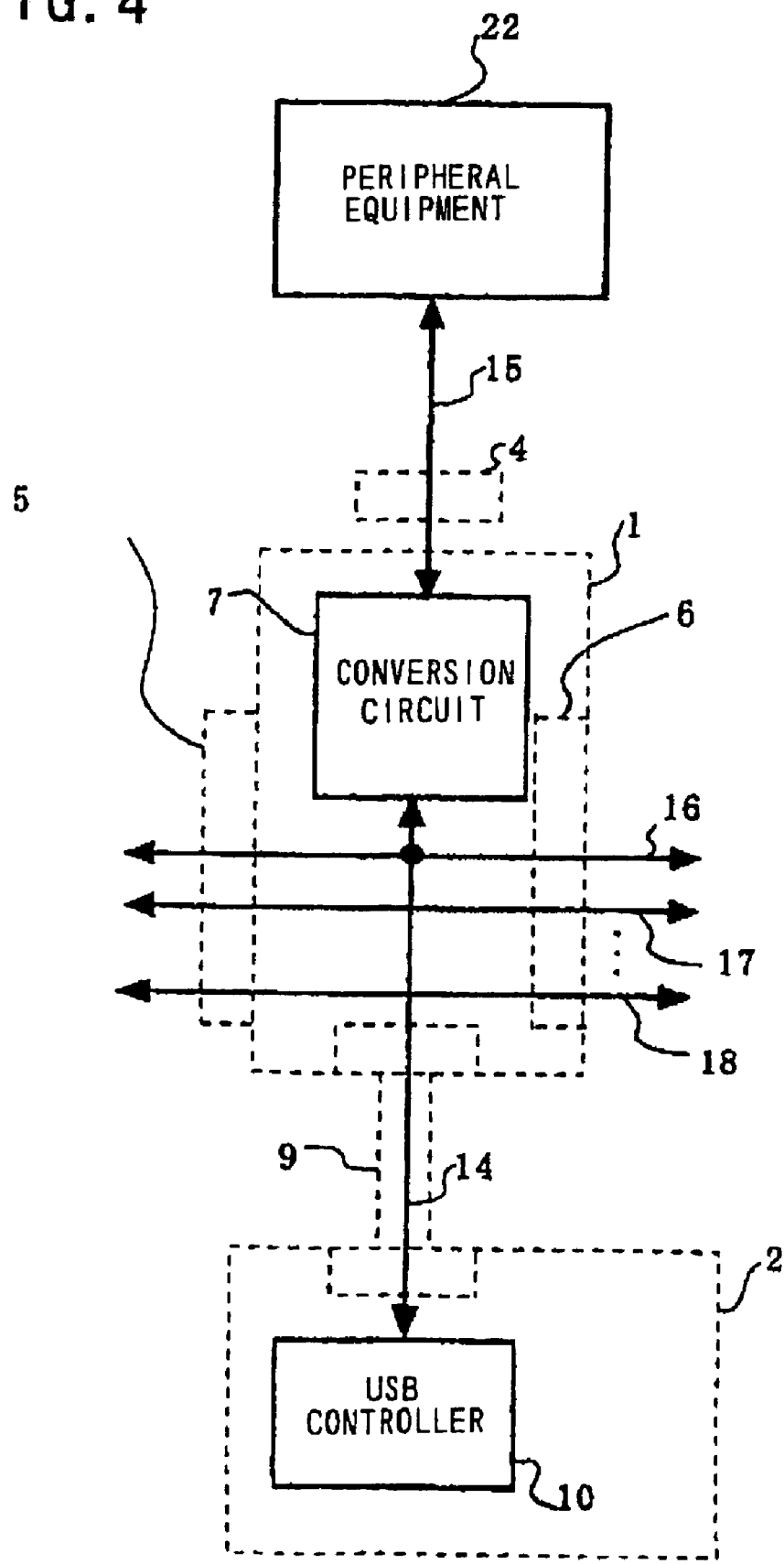
FIG. 4 is an electric connection diagram of the first embodiment shown in FIG. 1.

FIG. 4 shows a diagram of an electric connection performed by physical connection. A USB controller 10, which is integrated in the electrical/electronic product 2 and a conversion circuit 7 are connected by transmitting and receiving a USB signal therebetween, and a signal output from the USB controller 10 is input to the conversion circuit 7. The conversion circuit 7 converts the USB signal 14 to an external interface signal 15 and the external interface signal 15 is output to the peripheral device 22 or the like through the external interface connector 4. Similarly, the external interface signal 15 which is output from the peripheral device 22 or the like through the external interface connector 4 is input to the conversion circuit 7, the external interface signal 15 is converted to the USB signal 14 in the conversion circuit 7, and the USB signal is output to the USB controller 10. As the above, data exchange between the electrical/electronic product 2 and the peripheral device 22 is performed.

Furthermore, the USB signal 14 is multiplexed with any one of the extension USB signals 16, 17, and 18 in the separate type USB unit 1. As shown in FIG. 4, the USB signal 14 is multiplexed with the extension USB signal 16. These extension USB signals 16, 17, and 18 are transmitted to and received from the expansion connectors 5 and 6.

The number of the external USB signals depends on a design of the USB_HUB 11 shown in FIG. 2, and therefore, the number of the external USB signals can be increased or decreased by changing the design of the USB_HUB.

Next, actions of the separate type USB unit 12 are explained with reference to FIGS. 2 and 5.

As shown in FIG. 2, by connecting the USB connector 8 integrated in the electrical/electronic product 2 and the USB connector 3 integrated in the separate type USB unit 12 with the USB cable or the like, the electrical/electronic product 2 and the separate type USB unit 12 are connected. A USB signal is transmitted to and received from the external interface connector 13.

As mentioned later, the conversion circuit 7, which is the same as the conversion circuit 7 shown in FIG. 1, is arranged between the USB_HUB 11 and the external interface connector 13 in the separate type USB unit 12, and then, an external interface signal such as a serial, a parallel, a PS/2, a LAN, and the like can be transmitted to and received from the external interface connector 13. In FIGS. 2 and 5, a USB signal is transmitted to and received from the external interface connector 13 as an example.

Figure 5:
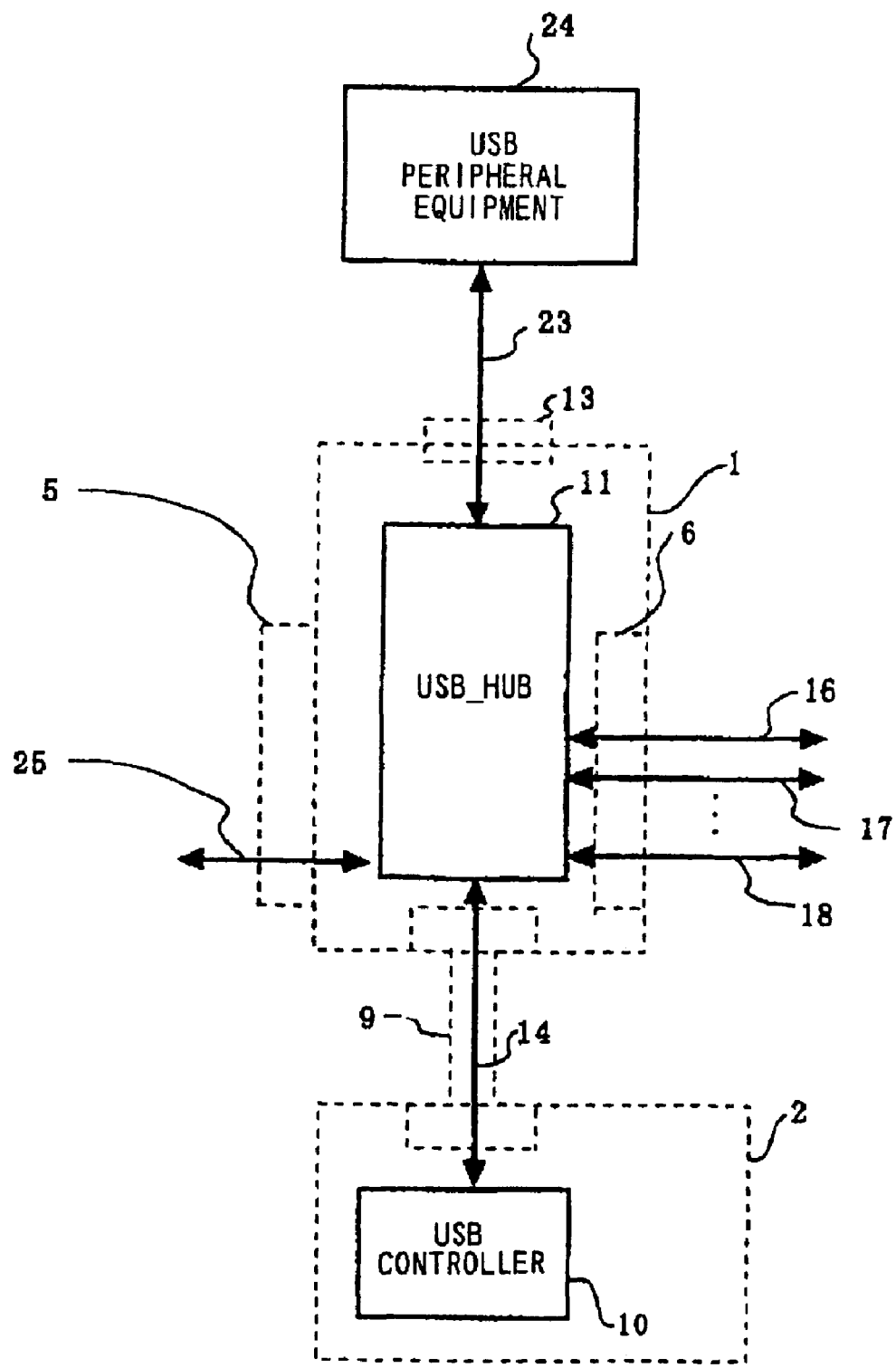
FIG. 5 is an electric connection diagram of the second embodiment shown in FIG. 2.

FIG. 5 shows an electric connection diagram. A USB controller 10 integrated in the electrical/electronic product 2 and the USB_HUB 11 are connected by transmitting and receiving the USB signal 14 therebetween, a signal output from the USB controller 10 is input to the USB_HUB 11 as a USB signal 14. A USB signal 23 is output from the USB_HUB and output to a USB peripheral device 24 or the like through the external interface connector 13. Similarly, a USB signal output from the USB peripheral device 24 or the like through the external interface connector 13 is input to the USB_HUB 11 and output to the USB controller 10 through the USB_HUB as the USB signal 14. As mentioned above, data exchange between the electrical/electronic product 2 and the USB peripheral device 24 is performed.

Furthermore, an extension USB signal 25 is transmitted to and received from the USB_HUB 11 and the expansion connector 5 and an extension USB signals 16, 17, and 18 are transmitted to and received from the expansion connector 6. The number of the external USB signals depends on a design of the USB_HUB 11, and therefore, the number of the external USB signals can be increased or decreased by changing the design of the USB_HUB.

As shown in FIGS. 1 and 2, a power supply and GND (Ground) are supplied from the electrical/electronic product 2 through the USB connector 8, the USB cable 9, and the USB connector 3 to the separate type USB unit 1 and the separate type USB unit 12, and also a power supply and GND are supplied to the expansion connectors 5 and 6 and the external interface connectors 4 and 13 in the separate type USB units 1 and 12.

Figure 3:
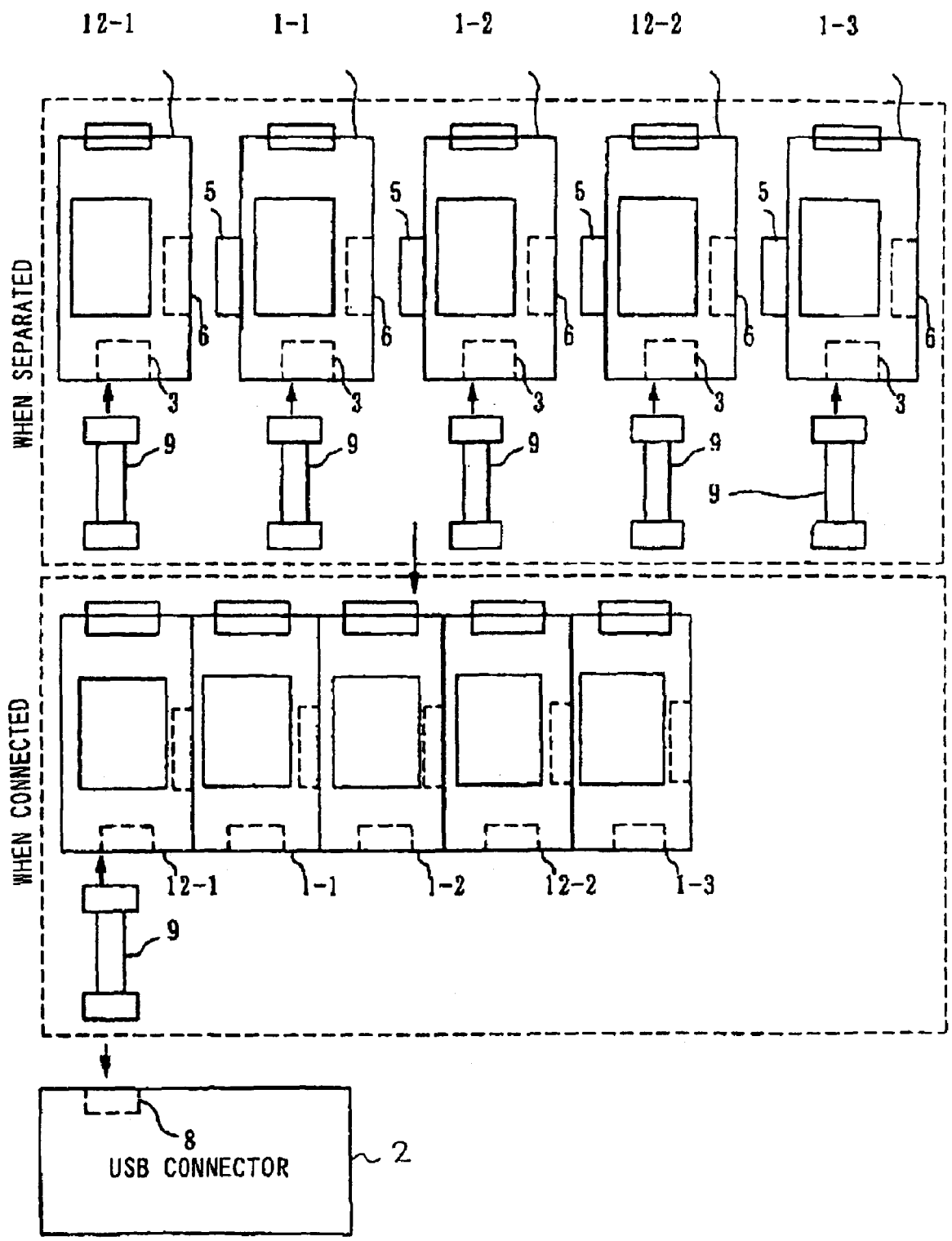
FIG. 3 is a block diagram illustrating the third embodiment of the present invention.
Figure 6:
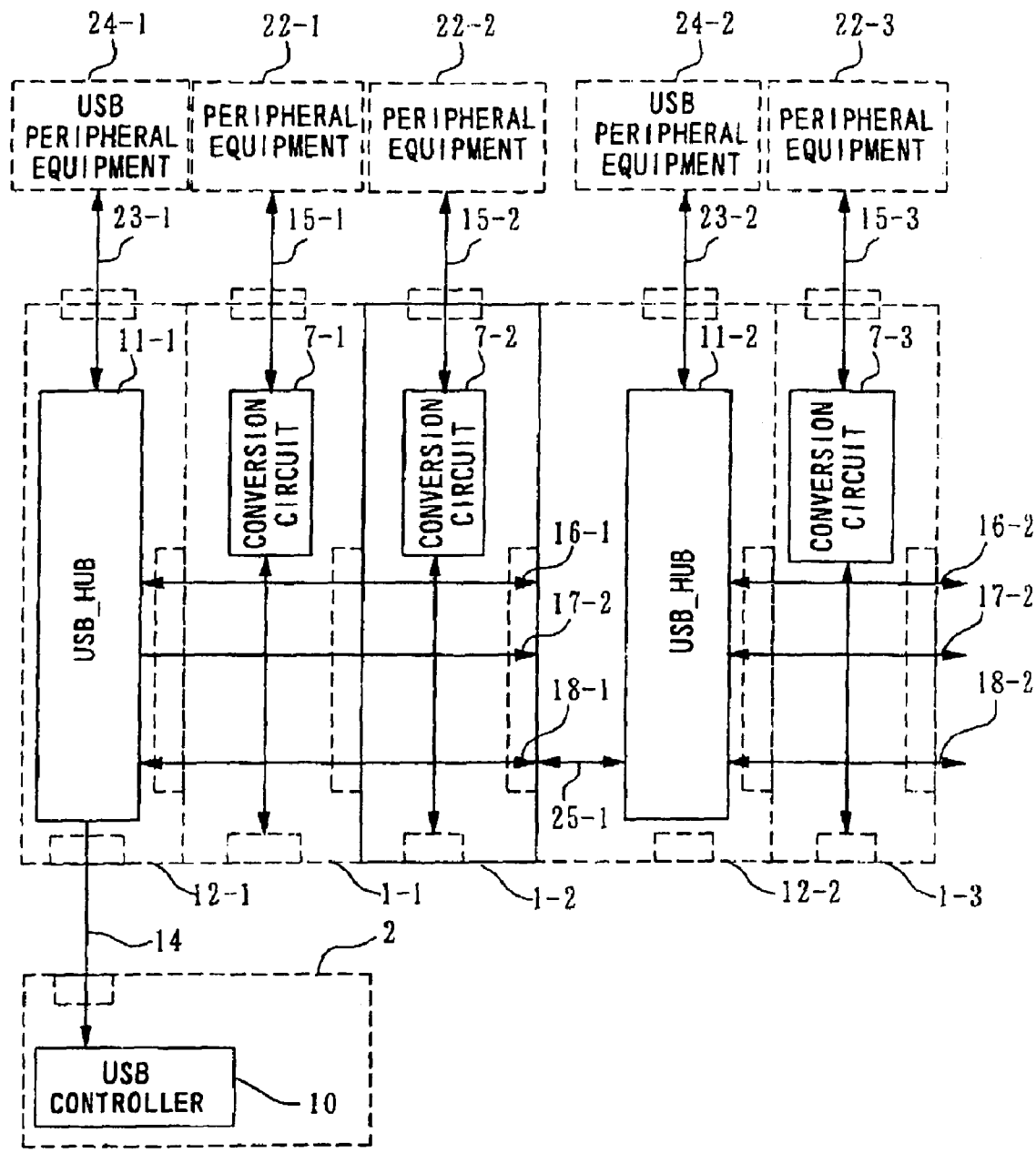
FIG. 6 is an electric connection diagram of the third embodiment shown in FIG. 3.

Next, the third embodiment of the present invention in which the separate type USB units 1 and 12 are connected with each other is explained with reference to FIGS. 3 and 6. In FIGS. 3 and 6, the total number of the separate type USB units 1 and 12, which are connected with each other, is five as an example, the connection number can be increased or decreased. Moreover, in the following explanation, separate type USB units 1-1, 1-2, and 1-3 indicate the separate type USB unit 1 and separate type USB units 12-1 and 12-2 indicate the separate type USB unit 12.

In FIG. 3, by connecting the expansion connector 5 in the separate type USB unit 1 and the expansion connector 6 in the separate type USB unit 12 or the reverse, the separate type USB units 12-1, 1-1, 1-2, 12-2, and 1-3 are connected and integrated so as to be an integrated USB unit. Furthermore, by connecting a USB connector 3 integrated in the electrical/electronic product 2 and a USB connector 3 integrated in the separate type USB unit 12-1, which is performed as a liaison, the electrical/electronic product 2 and the separate type USB units 12-1, 1-1, 1-2, 12-2, and 1-3 are electrically connected.

FIG. 6 shows the electric connection diagram. The USB controller 10 integrated in the electrical/electronic product 2 and a USB peripheral device 24-1, a signal is input and output therebetween, wherein the signal is transmitted and received through the USB cable 9 as a USB signal 14, through the USB_HUB 11, and as a USB signal 23-1 between the USB_HUB 11 and the USB peripheral device. Furthermore, the USB controller 10 and a peripheral device 22-1, a signal is input and output therebetween, wherein the signal is transmitted and received through the USB cable 9 as the USB signal 14, through the USB_HUB 11-1, as an extension USB signal 16-1 between the USB_HUB 11-1 and the separate type USB unit 1-1, through the conversion circuit 7-1 in the separate type USB unit 1-1, and as an external interface signal 15-1 between the conversion circuit 7-1 and the peripheral device 22-1. The USB controller 10 and a peripheral device 22-2, a signal is input and output therebetween, wherein the signal is transmitted and received through the USB cable 9 as the USB signal 14, through the USB_HUB 11-1, as the extension USB signal 17-1 between the USB_HUB 11-1 and the separate type USB unit 1-2, through a conversion circuit 7-2 in the separate type USB unit 1-2, and as an external interface signal 15-2 between the conversion circuit 7-2 and the peripheral device 22-2. The USB controller 10 and a USB peripheral device 24-2, a signal is input and output therebetween, wherein the signal is transmitted and received through the USB cable 9 as the USB signal 14, through the USB_HUB 11-1, as an extension interface signal 18-1 between the USB_HUB 11-1 and the separate type USB unit 1-2, as an extension interface signal 25-1 between the separate type USB unit 1-2 and a USB_HUB 11-2, through the USB_HUB 11-2, and as a USB signal 23-2 between the USB_HUB 11-2 and the USB peripheral device 24-2. The USB controller 10 and a peripheral device 22-3, a signal is performed of input and output therebetween wherein the signal is transmitted and received through the USB cable 9 as the USB signal 14, through the USB_HUB 11-1, as an extension interface signal 18-1 between the USB_HUB 11-1 and the separate type USB unit 1-2, as an extension interface signal 25-1 between the separate type USB unit 1-2 and a USB_HUB 11-2, through the USB_HUB 11-2, as an extension interface signal 16-2 between the USB_HUB 11-2 and the separate type USB unit 1-3, through a conversion circuit 7-3, and as an external interface signal 15-3 between the conversion circuit 7-3 and the peripheral device 22-3.

Since the electrical/electronic product 2 integrating the USB controller 10 and the USB peripheral devices 24-1 and 24-2 are electrically connected and the electrical/electronic product 2 and the peripheral devices 22-1, 22-2, and 22-3 are electrically connected, plural peripheral device or USB peripheral device can be connected to the electrical/electronic product 2.

Furthermore, when the construction of an internal circuit of the aforesaid separate type USB unit 1 and separate type USB unit 12 is changed so that the USB connector 8 integrated in the electrical/electronic product 2 is connected with any one of the USB connectors 3 in the separate type USB units 1 or the separate type USB units 12, of which 2 or more are connected each other, with the USB cable 9 or the like, the electrical/electronic product 2 can be connected with the peripheral device 22 and the USB peripheral device 24. The fourth embodiment of the present invention as the above-mentioned is explained with reference to FIG. 7.

Figure 7:
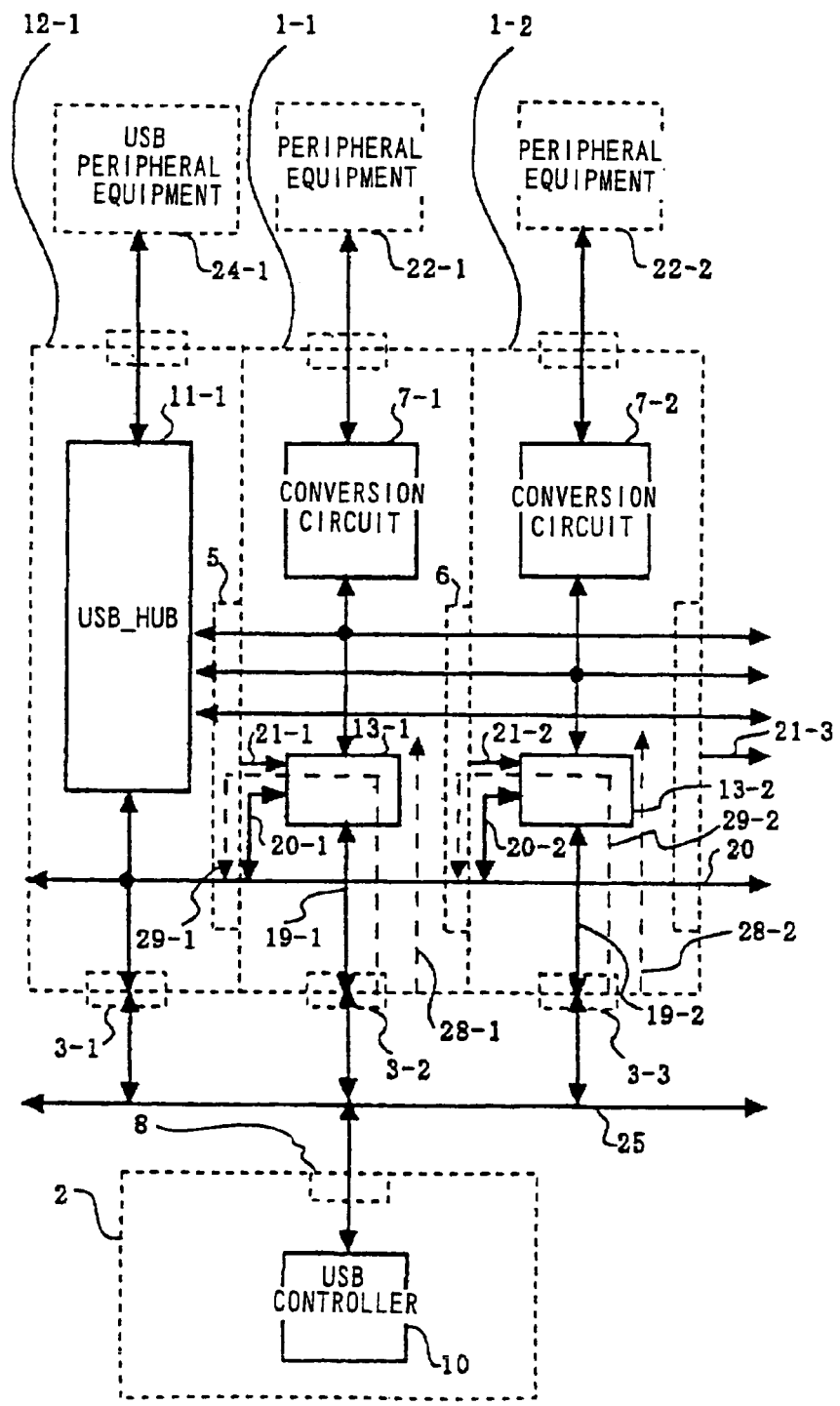
FIG. 7 is a block diagram illustrating the fourth embodiment of the present invention.

FIG. 7 differs from FIG. 6 in that selectors 13-1 and 13-2 are provided between the conversion circuit 7-1 in the separate type USB unit 1-1 and the USB connector 3-2, and the conversion circuit in the separate type USB unit 1-2 and the USB connector 3-3. When any one of the separate type USB units 12-1, 1-1, and 1-2 is individually connected to the electrical/electronic product 2 and the peripheral device, the USB signal 19-1 is transmitted to and received from the conversion circuit 7-1 through the selector 13-1 as shown by a signal path 28-1. Similarly, as shown by a signal path 28-2, the USB signal 19-2 is transmitted to and received from the conversion circuit 7-2 through the selector 13-2. Therefore, since the USB connector 8 in the electrical/electronic product 2 and the USB connector 3-1, 3-2, or 3-3 are connected with the USB cable or the like, the electrical/electronic product 2 is connected with the USB peripheral device 24-1 or the peripheral device 22-1 or 22-2.

Next, an example in which the separate type USB units 12-1, 1-1, and 1-2 are integrally connected is explained.

When the expansion connectors 5 and 6 of the separate type USB unit 12-1, 1-1, and 1-2 are connected, signals 21-1 and 21-2 which notify about the status of the connection between the separate type USB units 12-1, 1-1, and 1-2 to each other are output to the selectors 13-1 and 13-2. Accordingly, since signal paths in the selector 13-1 and 13-2 are switched, the USB signals 19-2, 20-2, and 20 are multiplexed, as shown by a signal path 29-1. And further, as shown by a signal path 29-2, the USB signal 19-2 branches the USB signals 19-2, 20-2, and 20 are multiplexed. In the status, the selector 13-1 and the conversion circuit 7-1, and the selector 13-2 and the conversion circuit 7-2 are electrically separated.

As a result, when the USB connector 8 in the electrical/electronic product 2 and any one of the USB connectors 3-1, 3-2, and 3-3 is connected with the USB cable or the like, the electrical/electronic product 2 can be connected with the USB peripheral device 24-1 and the peripheral devices 22-1 and 22-2. For example, in the case that the USB connector 8 and the USB connector 3-3 are connected with the USB cable, a signal is transmitted and received through the USB controller 10, as a USB signal 25, through the USB connector 3-3, and as a USB signals 19-2, 20-2, and 20 shown in the signal path 29-2, and finally the signal is transmitted to the USB_HUB 11-1. After the signal is transmitted to the USB_HUB 11-1, the above-mentioned actions are performed.

Figure 8:
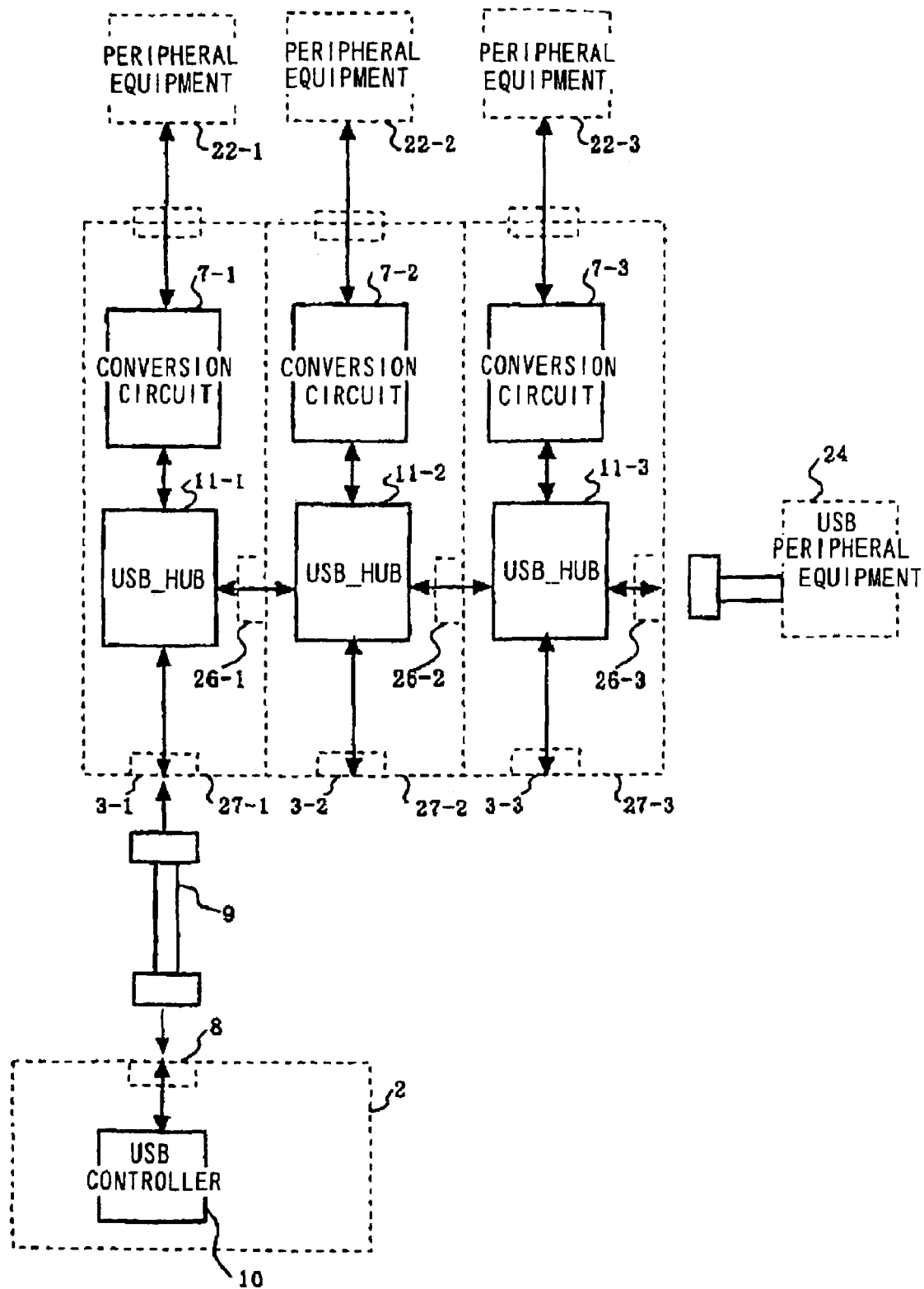
FIG. 8 is a block diagram illustrating the fifth embodiment of the present invention.
Figure 9:
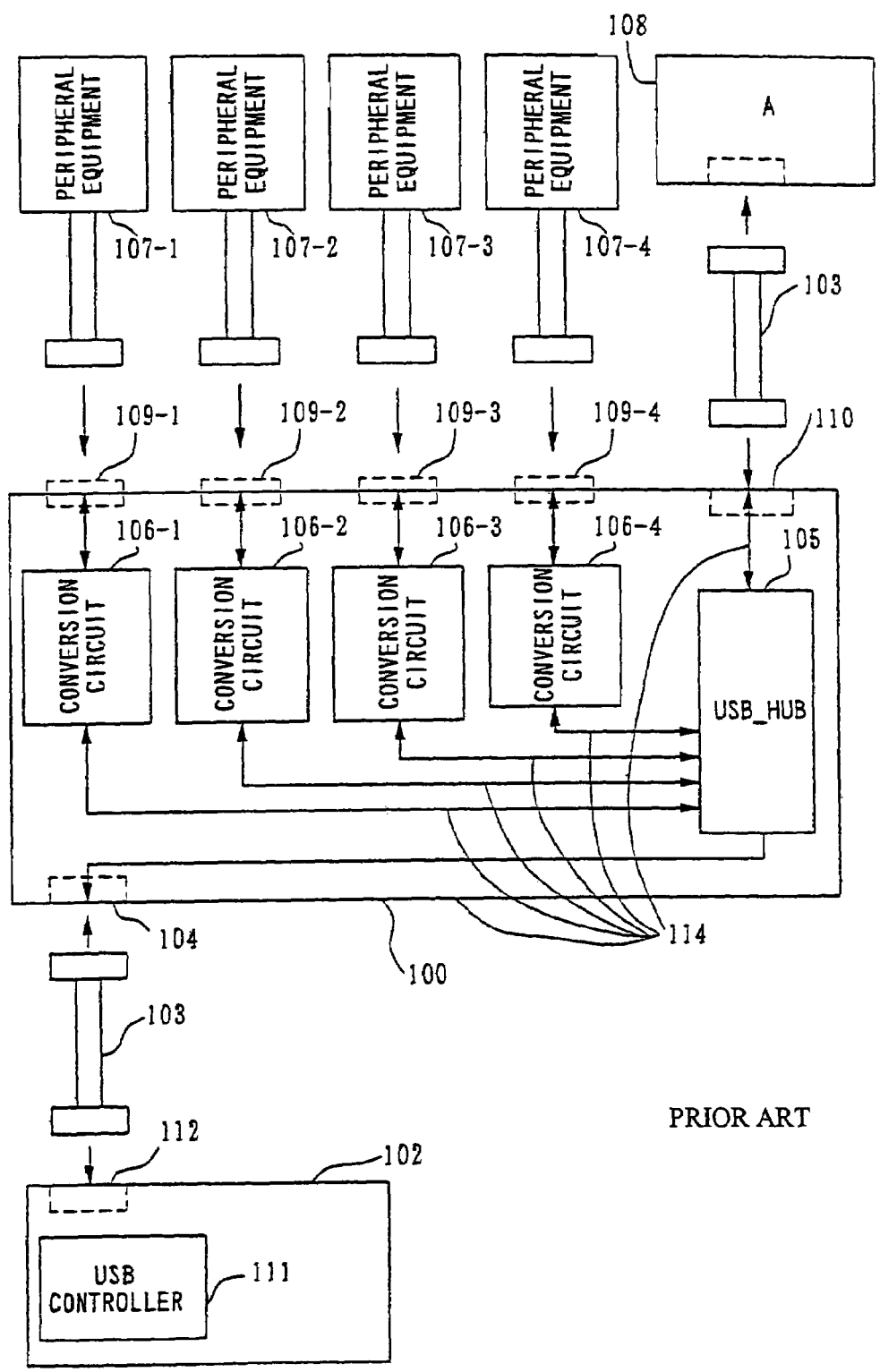
FIG. 9 is a block diagram illustrating an example of a conventional USB unit.

Next, the fifth embodiment of the present invention is explained with reference to FIG. 8. In the embodiment, a unit comprises a separate type USB unit 27-1 integrating the USB_HUB 11-1 and the conversion circuit 7-1, a separate type USB unit 27-2 integrating the USB_HUB 11-2 and the conversion circuit 7-2, and a separate type USB unit 27-3 integrating the USB_HUB 11-3 and the conversion circuit 7-3.

The separate type USB units 27-1, 27-2, and 27-3 can be respectively connected with expansion connectors 26-1, 26-2, and 26-3, and general USB connectors can be used for these expansion connectors.

In the embodiment, by connecting the electrical/electronic product 2 and the separate type USB unit 27-1 with the USB cable 9 or the like, the electrical/electronic product 2 and the peripheral device 22-1 is connected by signals through the USB_HUB 11-1 and the conversion circuit 7-1. And farther, the electrical/electronic product 2 and the peripheral device 22-2 are connected by signals through the USB_HUB 11-1, the expansion connector 26-2, the USB_HUB 11-2, and the conversion circuit 7-2. The electrical/electronic product 2 and the peripheral device 22-3 are connected by signals through the USB_HUB 11-1, 11-2, and 11-3, two expansion connectors 26-1 and 26-2, and the conversion circuit 7-3.

Furthermore, the USB peripheral device 24 and the USB unit can be extended to the USB_HUB 11-3 through the expansion connector 26-3. Similar to FIG. 7, if selectors are integrated in the separate type USB units 27-1, 27-2, and 27-3, by connecting the USB connector 8 in the electrical/electronic product 2 and the any one of the USB connectors 3-1, 3-2, and 3-3 in the separate type USB units 27-1, 27-2, and 27-3, the electrical/electronic product 2 can be connected with the peripheral devices 22-1, 22-2, and 22-3 or the USB peripheral device 24.

What is claimed is:

1. A USB interface by which an electrical/electronic product can be connected to a general peripheral device, said USB interface comprising:
    a USB connector for receiving a USB signal from the electrical/electronic product,
    a single conversion circuit for converting the USB signal into an external interface signal that is transmitted to the general peripheral device,
    a selector connected between said USB connector and said conversion circuit and responsive to a status signal;
    at least one external interface connector for transmitting the external interface signal to the general peripheral device, and
    at least one expansion connector for directly connecting to at least one other expansion connector of a second USB interface without a cable connected therebetween, said status signal indicating whether said at least one expansion connector is connected to said at least one other expansion connector;
    wherein said selector is configured to transmit said USB signal received from the USB connector to the second USB interface and to not transmit the USB signal directly to the conversion circuit when said status signal indicates that said at least one expansion connector is connected to said at least one other expansion connector; and
    wherein said selector is configured to transmit said USB signal received from the USB connector directly to the conversion circuit when said status signal indicates that said at least one expansion connector is not connected to said at least one other expansion connector.

2. The USB interface according to claim 1, wherein the at least one external interface connector is a parallel interface.

3. The USB interface according to claim 1, wherein the at least one external interface connector is a PS/2 interface.

4. The USB interface according to claim 1, wherein the at least one external interface connector is a LAN interface.

5. The USB interface according to claim 1, wherein said second USB interface comprises:
    a second USB connector for receiving the USB signal from the electrical/electronic product;
    a second single conversion circuit to convert the USB signal into a second external interface signal that is transmitted to a second general peripheral device,
    a second selector connected between said second USB connector and said second conversion circuit and responsive to a second status signal;
    a second external interface connector for transmitting the second external interface signal to the second general peripheral device, and
    a second expansion connector for directly connecting to the at least one expansion connector of said USB interface.

6. The USB interface according to claim 1, wherein said second USB interface comprises:
    a second expansion connector for directly connecting to the at least one expansion connector of said USB interface;
    a second external interface connector for transmitting and receiving USB signals to/from a USB peripheral device; and
    a hub to transmit and receive USB signals to/from said second external interface connector and to/from said second expansion connector for feeding USB signals to said USB peripheral device and to said conversion circuit of said USB interface respectively.

7. A USB interface device by which an electrical/electronic product can be connected to a general peripheral device and to a USB peripheral device, said USB interface device comprising:
    1) at least one first USB interface and at least one second USB interface each being modular units inter-connectable to each other without a cable therebetween,
    2) said first USB interface comprising:
        a) a first USB connector to transmit and receive USB signals to/from the electrical/electronic product,
        b) a first expansion connector for directly connecting to said second USB interface without a cable therebetween;
        c) a first external interface connector for transmitting and receiving external interface signals to/from the general peripheral device, d) a single conversion circuit to convert USB signals into external interface signals that are transmitted to the general peripheral device; and e) a selector connected between said first USB connector and said conversion circuit and responsive to a status signal that indicates whether said first expansion connector is connected to said second USB interface, said selector being configured to transmit USB signals received from said first USB connector to said second USB interface through said first expansion connector and to not transmit USB signals received from said first USB connector to said conversion circuit directly when said status signal indicates that said first expansion connector is connected to said second USB interface, said selector being configured to transmit USB signals received from said USB connector to said conversion circuit directly when said status signal indicates that said first expansion connector is not connected to said second USB interface;

3) said second USB interface comprising:

a) a second expansion connector for directly connecting to the first expansion connector of said first USB interface without a cable therebetween;

b) a second external interface connector for transmitting and receiving USB signals to/from the USB peripheral device, and c) a hub to transmit and receive USB signals to/from said second external interface connector and to/from said second expansion connector for feeding USB signals to said USB peripheral device and to the conversion circuit of said first USB interface respectively.

8. The USB interface device as recited in claim 7, further comprising:

1) a third USB interface, said third USB interface being a modular unit and connected to said first USB interface without a cable therebetween;

2) said first USB interface further including:

a) a second expansion connector for directly connecting to said third USB interface without a cable;

3) said third USB interface comprising:

a) a third USB connector to transmit and receive USB signals to/from the electrical/electronic product, b) a third expansion connector for directly connecting to said second expansion connector of said first USB interface without a cable;

c) a third external interface connector for transmitting and receiving external interface signals to/from another general peripheral device;

d) another single conversion circuit to convert USB signals into external interface signals that are transmitted to the another general peripheral device; and e) a selector connected between said third USB connector and said another conversion circuit and responsive to another status signal that indicates whether said third expansion connector is connected to said second expansion connector.

9. A separate type Universal Serial Bus (USB) unit, comprising:

a USB connector for transmitting USB signals to an electrical/electronic device and for receiving USB signals from said electrical/electronic device;

an external interface connector for transmitting external interface signals to a peripheral device and for receiving external interface signals from said peripheral device;

an expansion connector for transmitting USB signals to a second separate type USB unit and for receiving USB signals from said second separate type USB unit when said expansion connector is connected to said second separate type USB unit;

a conversion circuit for converting USB signals into external interface signals and for converting external interface signals into USB signals, said conversion circuit connected to receive external interface signals from said external interface connector and to transmit external interface signals to said external interface connector, said conversion circuit connected to receive USB signals from said expansion connector and to transmit USB signals to said expansion connector; and a selector, said selector connected to receive USB signals from said USB connector and to transmit USB signals to said USB connector, said selector connected to receive USB signals from said expansion connector and to transmit USB signals to said expansion connector, said selector connected to receive USB signals from said conversion circuit and to transmit USB signals to said conversion circuit, said selector connected to receive a status signal that indicates whether said expansion connector is connected to said second separate type USB unit;

wherein said selector is configured such that when said status signal indicates that said expansion connector is not connected to said second separate type USB unit, said selector transmits USB signals received from said USB connector to said conversion circuit and transmits USB signals received from said conversion circuit to said USB connector; and wherein said selector is configured such that when said status signal indicates that said expansion connector is connected to said second separate type USB unit, said selector transmits USB signals received from said USB connector to said expansion connector and transmits USB signals received from said expansion connector to said USB connector and does not transmit USB signals received from said USB connector directly to said conversion circuit.

* * * * *